United States Patent [19]

Parker

[11] Patent Number: 5,252,667
[45] Date of Patent: Oct. 12, 1993

[54] POLYMER BLENDS INCLUDING IONOMERS

[75] Inventor: Hsing-Yeh Parker, Holland, Pa.

[73] Assignee: Rohm and Haas Company, Philadelphia, Pa.

[21] Appl. No.: 986,179

[22] Filed: Dec. 7, 1992

Related U.S. Application Data

[62] Division of Ser. No. 505,081, Apr. 4, 1990, Pat. No. 5,202,381.

[51] Int. Cl.$^5$ .................. C08L 33/04; C08L 51/06
[52] U.S. Cl. .................................... 525/85; 525/78; 525/195; 525/201; 525/221; 525/222; 525/225; 525/902; 524/500; 524/504; 524/515; 524/522; 524/523; 524/527
[58] Field of Search ............... 525/85, 80, 78, 902, 525/330.2, 201, 221

[56] References Cited

U.S. PATENT DOCUMENTS

| | | | |
|---|---|---|---|
| 3,665,060 | 5/1972 | Bergomi et al. | 525/201 |
| 3,803,267 | 4/1974 | Kuwahara et al. | 525/201 |
| 3,859,384 | 1/1975 | Carty et al. | 525/85 |
| 4,220,734 | 9/1980 | Kosugi et al. | 525/85 |
| 4,398,019 | 8/1983 | Cox et al. | 528/183 |
| 4,419,482 | 12/1983 | Teyssie et al. | 524/560 |
| 4,468,499 | 8/1983 | Siegfried et al. | 525/301 |
| 4,696,973 | 9/1987 | Kamata et al. | 525/85 |
| 4,867,481 | 9/1989 | Whang | 283/91 |
| 5,003,012 | 3/1991 | Chamberlain et al. | 525/330.2 |

FOREIGN PATENT DOCUMENTS 1917054 10/1969 Fed. Rep. of Germany.
1226461 4/1969 United Kingdom.

OTHER PUBLICATIONS

Polyblends of an Ionomer with Nine Different thermoplastics, RD Deanin et al., Plastics Engineering Dept., University of Lowell (Mass.).

Low Molecular Weight Ionomers as Processing Aids and Additives, DF Danneels, First European Conference on High Perf. Additives, London, May 10–11, 1988.

A Solid Solvent as Processing Aid for Polystyrene, CL Chung et al., Polymer Science and Engineering Program, Rensselaer Polytechnic Institute, Troy, N.Y. 12180-3590.

Primary Examiner—James J. Seidleck
Assistant Examiner—M. L. Warzel
Attorney, Agent, or Firm—Roger K. Graham

[57] ABSTRACT

Poly(vinyl chloride) exhibits a useful combination of acceptable flow for injection molding, improved processability, and acceptable heat distortion resistance and toughness when modified with a multi-stage polymer having as one stage an alkyl (meth)acrylate polymer or copolymer containing a low level of a copolymerized unsaturated acid partly to completely in the form of its alkali metal salt. In preferred compositions, the melt viscosity under injection molding conditions of the blend will be equal to or less than that of the PVC alone.

13 Claims, No Drawings

POLYMER BLENDS INCLUDING IONOMERS

This is a divisional application of U.S. Ser. No. 07/505,081, filed Apr. 4, 1990, now U.S. Pat. No. 5,202,381.

BACKGROUND OF THE INVENTION

1. Field of the Invention

This invention relates to improved poly(vinyl chloride) compositions, especially those suitable for injection molding, and to a process for preparing such compositions.

2. Description of the Prior Art

It is known that processing of rigid poly(vinyl chloride), that is, polymers containing at least 80 weight percent vinyl chloride units and containing little or no plasticizer, is extremely difficult to accomplish without the use of polymeric processing aids. Such processing aids when used at levels of from about 0.1 to about 10 parts per 100 parts of poly(vinyl chloride) (PVC), more usually from about 0.5 to about 10 phr (parts per 100 parts of PVC), cause the PVC to flux under heat into a thermoplastic leathery state on a mill roll or other similar mixer. The processing aids further allow the PVC to be processed in an extruder into a molten thermoplastic state without the need for high shear forces and temperatures. They further impart to the processed product smoother, uniform surfaces.

A thorough description of processing aids for PVC may be found in "Thermoplastic Polymer Additives, Theory and Practice," Edited by John T. Lutz, Jr., Marcel Deckker, Inc., New York and Basel, 1988 (chapter by R. P. Petrich and John T. Lutz, Jr.) and "History of Polymer Composites," Edited by R. B. Seymour and R. D. Deanin, VNU Science Press BV, Netherlands, 1987 (chapter by D. L. Dunkelberger).

Particularly useful as processing aids have been high molecular weight polymers which are predominately composed of units derived from methyl methacrylate, which have been commercially available for about 30 years. These additives are especially useful in that they do not detract from the important physical properties expected from the final processed PVC object, such as heat distortion temperature, tensile strength, and impact-resistance properties.

One deficiency that they do have is that the high molecular weight polymers, even at the low levels used, either maintain or increase the melt viscosity of the resultant blend. This is especially undesirable in injection molding applications, where it is desired to have a melt of low viscosity for ease in mold-filling. Lowering of the molecular weight of the processing aid will decrease the melt viscosity of the blend, but sometimes at the sacrifice of the heat distortion temperature of the final processed object.

Similar effects (improved flow at the cost of lowered heat distortion temperature) are found with other non-polymeric additives, such as plasticizers, or when a lower molecular weight PVC or a PVC copolymer is used.

The effect sought herein, wherein a high molecular weight polymer blend on heating to process exhibits anomalously low melt viscosity, yet reverts to the performance expected from the high molecular weight polymer upon cooling, has been accomplished in certain limited polymer systems by use of a "solid solvent" which is compatible with the polymer matrix on cooling; yet melts and plasticizes the matrix polymer on heating. Such "solid solvents" are rare, unknown for PVC, and still offer deficiencies in end use application, such as extractability with solvents, contribution to taste and odor of materials packaged therein, or lack of permanence.

A second approach is to use as the additive a liquid crystalline polymer which forms a mesophase on processing. Such specific copolymers are expensive for the purpose herein, which is to modify the rheological behavior of a high-volume low-cost thermoplastic and low add-on cost.

There thus has been a long-felt need for an additive which will allow PVC to be processed in injection molding to useful objects which maintain the physical properties of a medium- to high-molecular weight PVC, such as heat distortion temperature and toughness, while being capable of being molded under commercially practical and safe conditions of temperature, time, and pressure.

SUMMARY OF THE INVENTION

I have discovered that specific copolymers of acrylic or methacrylic monomers with monomers bearing acid functionality, the acid groups being partially or completely neutralized with an alkali, alkaline earth, or transition metal salt, are useful at low levels in the processing of PVC or copolymers of vinyl chloride to obtain a lowered melt viscosity, yet allow good fluxing and melt performance, as well as exhibiting desirable physical properties when the blend is cooled. Specifically, I have discovered the utility of certain additive polymers containing at least 30 weight percent of units derived from at least one alkyl acrylate or alkyl methacrylate, wherein the alkyl group contains from 1 to 12 carbon atoms, from 0 to about 70 weight percent of units derived from at least one other vinyl or vinylidene monomer, and from about 0.5 to about 10 parts per 100 parts of all other units of the additive polymer (that is, derived from alkyl acrylates, alkyl methacrylates, and all other monomers) of units derived from an unsaturated acid which is partially to completely in the form of its alkali, alkaline earth, or transition metal salt. In the preferred compositions, the melt viscosity of the composition, as measured under injection molding conditions, will be equal to or less than the melt viscosity for the polymer of vinyl chloride absent the additive polymer.

DESCRIPTION OF THE INVENTION AND PREFERRED EMBODIMENTS

Having summarized the invention, the invention will now be discussed in detail by reference to the following specification and non-limiting examples.

By PVC or "polymer of vinyl chloride" is meant a homopolymer of vinyl chloride, or a copolymer of at least 80 weight percent of units derived from vinyl chloride with up to about twenty weight of one or more second vinyl monomers. Such monomers may be alpha-olefins, such as ethylene, propylene, and the like, vinyl esters, such as vinyl acetate, vinyl propionate, vinyl benzoate, and the like, vinylidene chloride, and alkyl acrylate, such as methyl acrylate, lauryl acrylate, and the like, a vinyl aromatic monomer, such as styrene, vinyl toluene, and the like, acrylonitrile, methacrylonitrile, a maleimide, such as N-cyclohexyl maleimide, N-phenylamaleimide, or maleimide, or an alkyl methacrylate, such as methyl methacrylate, cetyl methacrylate, and the like. Preferred for their commercial availability, their thermal stability, and their color are copolymers with up to about twenty weight percent of units derived from one or more of propylene, ethylene, vinyl acetate, vinylidene chloride, or a lower alkyl acrylate.

By "polymer of vinyl chloride" I further include chlorinated poly(vinyl chloride), which also will demonstrate improved processability when admixed with the additive polymers of the present invention.

For most uses, however, where exposure to heat may occur, it is preferred to use a homopolymer of vinyl chloride or a copolymer with a monomer whose homopolymer has a high glass temperature, such as styrene, alpha-methylstyrene, a maleimide, and the like, so as to obtain the highest value of heat distortion temperature for the blend. Especially preferred for cost and availability is the homopolymer of vinyl chloride. The polymers of vinyl chloride may be prepared by any of the known means; preferred are bulk and suspension polymerization.

Although in the blends of the present invention a broad range of molecular weights of the poly(vinyl chloride) homo- or copolymer (hereinafter designated PVC) component is envisaged, major uses for the blend will be in injection molding applications. Here it is believed that a weight-average molecular weight range of from about 40,000 to about 120,000 will be preferred for injection molding. Above that molecular weight, the melt, even with the polymeric additive, will not flow readily enough or will require excess pressure or too high a processing temperature to achieve molded parts of good appearance, whereas below that range, the physical properties of the molded blend will be unsatisfactory. However, other molecular weights of the PVC resin may be employed in injection molding uses.

The molecular weight of PVC commercial resins is not always directly available, but is reported in terms of the Fikentscher K values determined by solution viscosity measurements. A Fikentscher K value of from about 50 to about 60 is preferred for injection molding purposes.

The amount of the additive polymer of the present invention, which I shall designate as "acrylic ionomer", will vary depending on the processing conditions chosen and the molecular weight of the PVC resin used. For most uses, the blend will contain from about 1 to about 20 parts of the additive polymer (acrylic ionomer) per 100 parts of the polymer of vinyl chloride, but higher or lower levels may be employed in certain circumstances. Preferred for the best balance of efficacy without detracting from the physical properties of the blends is from about 2 to about 10 parts of the additive polymer.

The composition of the additive polymer may vary widely within the limits defined above. For certain purposes, it is desired the additive polymer be miscible with the vinyl chloride polymer, such as in compositions which further contain glass fiber. Here it is preferred the alkyl (meth)acrylate be methyl methacrylate. For other purposes, such as lowering the melt viscosity of the blend without adversely affecting the physical properties, an immiscible or partially immiscible additive polymer is preferred as being more efficient. Here is preferred the alkyl (meth)acrylate be n-butyl acrylate.

Thus the "acrylic ionomer" is comprised of a copolymer containing at least about 30 weight percent of units derived from an alkyl methacrylate, such as methyl methacrylate, ethyl methacrylate, isobutyl methacrylate, octyl methacrylate, dodecyl methacrylate, isodecyl methacrylate, and the like or from an alkyl acrylate, such as methyl acrylate, ethyl acrylate, n-butyl acrylate, s-butyl acrylate, 2-ethylhexyl acrylate, dodecyl acrylate, and the like. The copolymer further contains about 0.5 to about 10 parts per 100 parts of all other units of units derived from an unsaturated acid, the unsaturated acid being partially to completely in the form of an alkali, alkaline earth, or transition metal salt.

The unsaturated acid and/or its alkali, alkaline earth or transitional metal salt must be copolymerizable with the alkyl acrylate or alkyl methacrylate. Alkali encompasses sodium, potassium, lithium, cesium, and rubidium, of which sodium and potassium are preferred. Alkaline earth encompasses calcium, magnesium, strontium, and barium, of which calcium and magnesium are preferred. Transition metal encompasses chromium, manganese, iron, cobalt, nickel, copper, zinc, zirconium, molybdenum, cadmium, lanthanum, tungsten, and mercury, of which zinc is preferred. The acid groups may be derived by partial hydrolysis or pyrolysis of a blocked acid group, such as hydrolysis of a methyl ester or pyrolysis of a tertiary-butyl ester. However, it is most convenient to incorporate same by copolymerization of a suitable unsaturated acid-containing monomer, which is co-polymerized as the unsaturated acid and then post-treated to form the salt, or alternatively may be copolymerized directly as the salt. The unsaturation is preferably conjugated with the acid group, such as with methacrylic acid, monoethyl maleate, and the like, but may be remote from the acid group if the copolymerization proceeds readily, such as with p-vinylbenzenesulfonic acid or acryloxypropionic acid. The unsaturated acid may be a sulfonic acid, such as styrenesulfonic acid, a partially esterified sulfuric acid, such as beta-sulfatoethyl methacrylate, a phosphonic acid, such as styrenephosphonic acid, a phosphoric acid, such as beta-phosphatoethyl acrylate, and the like. Preferred for ease of incorporation and availability are unsaturated carboxylic acids, or their immediate, readily available precursors, such as unsaturated anhydrides. Included are such monomers as acrylic acid, methacrylic acid, alpha-phenylacrylic acid, itaconic acid, maleic acid, fumaric acid, monoalkyl fumaric acid, methacrylic acid, acrylic acid, crotonic acid, alpha-methylene-delta-methyladipic acid, acryloxypropionic acid, p-vinylbenzoic acid, monovinyladipic acid, maleic anhydride, and the like. Especially preferred, for retention of glass temperature of the blend, availability, and ease of incorporation, is methacrylic acid.

Total neutralization of the units derived from the copolymerized unsaturated acid is not necessary. It is preferred that at least about 10% to about 100% be neutralized; for uses studied to date, about 100% neutralization is especially preferred. The optimum extent of neutralization may have to be determined for the particular PVC and acrylic ionomer involved, depending on the molecular weight of the PVC and the molecular weight and composition of the ionomer.

Units derived from other unsaturated monomers, such as vinyl or vinylidene monomers, may also be present. Such include other esters of methacrylic acid, esters of acrylic acid, vinyl aromatic monomers, vinyl esters of saturated acids, acrylonitrile, methacrylonitrile, methacrylic acid or acrylic acid, the latter being un-neutralized, and the like. For reasons of cost and ability to create less miscible copolymers, styrene is a preferred comonomer.

A termonomer, including a second alkyl (meth)acrylate, may be useful in controlling the miscibility of the additive polymer component with PVC. It is believed that for certain injection molding uses, if the additive polymer is immiscible or only partially miscible with the PVC, a better balance of processing and physical properties (heat distortion, brittleness resistance) may occur.

The molecular weight of the additive polymer is important; if it is too high, the melt viscosity of the PVC blend will not be sufficiently reduced for good flow in the processing, molding, and/or forming operations, whereas if the molecular weight is too low, the PVC blend may be embrittled or poorer fluxing of the blend may occur. Molecular weight for the acrylic ionomer is determined by gel permeation chromatography and is reported as a weight-average molecular weight. Values of 5000 to 400,000 are preferred, although useful compositions, especially where lowered melt viscosity is not as important, may be prepared with values of the ionomeric additive molecular weight above 400,000. For miscible polymers such as an ionomer prepared mainly from methyl methacrylate, it is preferred the molecular weight be below about 100,000.

For injection molding purposes, it is preferred that the additive polymer be partially or totally immiscible with the polymer of vinyl chloride during the injection molding process. The additive polymer and the polymer of vinyl chloride will exhibit an immiscible morphology at least in the molten state of the injection molding process, and possibly even when the melt is cooled. An immiscible morphology will exhibit itself in a lowering of transparency or a detection of more than one phase by microscopy or a detection of more than one glass temperature by, e.g., differential scanning calorimetry. A partially immiscible morphology will exhibit itself in a similar manner, but, e.g., the glass temperatures may not be those of the corresponding phases when measured separately, but instead some dilution or modification of the value will be noted.

The additive polymer need not function as a processing aid per se as long as it functions to reduce the melt viscosity of the blend without adversely affecting other key properties. It may then be necessary to add a small amount of a conventional processing aid for PVC to aid in fluxing and processing the blend. Preferred is the case where the acrylic ionomer also functions as a processing aid.

The acrylic ionomer may be prepared by any of several preparative methods, such as solution, bulk, emulsion, or suspension polymerization. The additive polymer may be prepared by polymerizing a mixture which carries a precursor unit, that is, one which can be converted to the unit containing the ionomeric function. Such precursors include an easily cleaved ester, such as the t-butyl group, which by pyrolysis can form an acid group which is then neutralized to the ionomer. Another precursor is a volatile salt, such as an ammonium salt, which on heating may lose volatile ammonia and form the acid, which then can be neutralized.

The most important precursor group is the acid group which is then neutralized partially or wholly to the ionomeric group. Because the monomeric acids are much less water-soluble than the monomer containing the ionomeric group, it is convenient to polymerize the additive polymer containing the un-neutralized acid unit or units followed by partial or complete neutralization of the polymer.

The additive polymer may be isolated from its preparative media by filtration and washing, if the polymer is insoluble in the media. If soluble, a precipitant may be added, the polymer filtered, washed, and dried. If the additive polymer is in the form of a non-aqueous dispersion, the solvent may be evaporated, and the polymer comminuted to powder. If the polymeric additive is prepared in bulk, the polymeric additive may be ground to a fine powder. If the polymeric additive is formed in aqueous dispersion, it may be isolated by evaporation, by coagulation, or by spray-drying. This isolation may be accomplished in the presence of the PVC; for example, the aqueous dispersion may be evaporated onto the PVC and the mixture dried prior to addition of other additives and blending. Another method is to co-isolate aqueous dispersions of the PVC and the polymeric additive.

As the additive polymer may be in a physical form or of a molecular weight which causes difficulty in packaging, conveying or admixing the additive polymer with the polymer of vinyl chloride, it may be desirable to combine the additive polymer with another polymer. One means of so doing is to polymerize the acrylic ionomer component in the presence of a pre-formed harder polymer. Even more efficient is to form the additive polymer component first, by means such as emulsion polymerization, and then polymerize another monomer or monomers in the presence of the pre-formed polymer. Normally, by this method a multi-stage or core/shell polymer is formed, the shell or second-polymerized polymer surrounding the first polymer and, if the second polymer is of high enough softening temperature, aiding in the isolation of a free-flowing powder by means such as coagulation, spray-drying, and the like. It is preferred that the another stage of the multi-stage polymer be a polymer having a glass temperature greater than about 60° C.

So as not adversely to affect the flow of the blend upon processing, it is preferred that the weight-average molecular weight of any other stage of the multi-stage additive be below about 100,000. To exhibit the best efficiency, it is preferred that just enough of any other stage of the multi-stage polymer be present to aid in isolation, so that at least 50% weight percent of the multi-stage polymer, and preferably at least 70% of the multi-stage polymer, is the additive component.

For ease in dispersing the acrylic ionomer stage, it is preferred that any other stage of the multi-stage additive be miscible with the polymer of vinyl chloride, such as being a polymer formed predominantly of units derived from methyl methacrylate.

The polymeric additive is normally added to the poly(vinyl chloride) by dry-blending prior to processing. At the same time, other important ingredients necessary to processing the PVC without thermal decomposition may be added. Such stabilizers may be organotin compounds, such as dimethyl diisoctylthiogycolate, calcium-zinc salts of organic acids, such as calcium stearate or zinc stearate or their mixtures, organolead compounds, such as dibasic lead phosphite, organocadmium and organobarium compounds, and the like. Such stabilizers are usually present at levels from about 0.1 to about 5 parts per 100 parts of PVC resin, conventionally noted as phr.

Other additives may be present in the dry-blend, such as pigments, such as colorants, infra-red reflecting pigments, dyes, and the like; plasticizers; other processing aids or lubricants designed to improve fluxing of the mix or avoidance of sticking to hot metal surfaces, such as butyl acrylate/styrene//methyl methacrylate or butyl acrylate//methyl methacrylate core/shell polymers with a low molecular weight core and a high molecular weight shell, and the like; other lubricants, such as long chain fatty acids, their salts, and their long chain esters, low molecular weight polyolefins, and the like; flame retardants or smoke retardants, such as zinc oxide, organophosphorus compounds, and the like; ultraviolet stabilizers, such as hindered phenols, hindered amines, aromatic o-hydroxyketones, and the like; heat distortion improvers, such as polyglutarimides, copolymers of isobornyl methacrylate, copolymers of alpha-methylstyrene/methyl methacrylate/acrylonitrile, copolymers of styrene or alpha-methylstyrene with maleic anhydride and/or a maleimide, and the like; and other additives known to the art.

Also present may be impact modifiers, at amounts of from about 3 to about 20 phr. Many materials are known to be impact modifiers for PVC. Such include core/shell polymers of a butadiene-based core, such as poly(butadiene), poly(butadiene-styrene), poly(butadiene-acrylonitrile), poly(butadiene-butyl acrylate), and the like, with one or more shells of poly(methyl methacrylate), poly styrene, poly(styrene-acrylonitrile), poly(styrene-methyl methacrylate), poly(styrene-methyl methacrylate-acrylonitrile), and the like. These core/shell polymers are efficient impact modifiers for non-weatherable applications.

Another useful class of impact modifiers are those based on poly(alkyl acrylates), such as core/shell modifiers with poly(butyl acrylate) cores, the butyl acrylate polymer being a homopolymer or a copolymer containing styrene, and further containing polyunsaturated monomers, such as divinylbenzene, glycol dimethacrylates, glycol diacrylates, polyol polymethacrylates, allyl methacrylate, and the like. The outer shell of such polymers is usually a polymer rich in units derived from methyl methacrylate or a copolymer of styrene with acrylonitrile.

Other classes of impact modifiers may also be employed, such as single- or multistage polymers based on an ethylene-propylene or ethylene-propylene-non-conjugated diene rubber, or a butadiene-acrylonitrile rubber, or a silicone-based elastomer, or a ethylene-vinyl acetate rubber, or chlorinated polyethylene.

There may further be present one or more of a variety of fillers, either reinforcing or non-reinforcing. Such fillers, which include fibrous, flaked, and powdery materials, will be present in amounts from about 1 to about 50 phr. They may contain chemical coupling agents, such as organotitanates or functionalized silicon additives, to aid in adhesion to the PVC. Such fillers include glass fiber, glass flakes, glass microspheres; other mineral fibers; talc, wollastonite, mica, and the like; carbon black; alumina, silica, titanium dioxide, and the like.

The acrylic ionomers containing mainly units derived from methyl methacrylate are especially useful when added to a compounded PVC containing glass fibers. The resulting molded object will retain the good strength properties seen when testing the molding in the direction parallel to the flow during processing, but adds additional strength to the processed blend when it is tested in the direction perpendicular to the direction of flow. Such uniformity of test response relates to improved end use properties in a processed object of commerce, wherein non-sensitivity of a measurement or test to the direction of impact or load is desired.

As noted, it is most common to combine all ingredients of the PVC blend prior actual melt-processing, although additives may be added to the melt if desired. Normally the dry blend is then processed with heat and shear, such as in an intensive mixer, such as a Brabender or Banbury, on a two-roll mill, or in an extruder, until the PVC has "fluxed" or passed to a molten form. The fluxed material may then be dropped from the mixers, or sheeted into forms suitable for compression molding, or for remelting and re-processing.

For most uses, the molten polymer is conveyed through an extruder, usually either a single-screw or twin-screw extruder at temperatures and shear conditions sufficient to convey the molten material readily but without causing over-heating and degradation. The melt may then be passed through one or more dies into strands for pelletizing, with the pellets later be re-processed into the final desired article. On the other hand, the melt may be directly converted into the final object by such operations as passing through an appropriate die to form a sheet, film, or profile-shaped article. The melt may also be formed into parisons for subsequent blow-molding. The melt may also be injection-molded by injection into an appropriate mold to form molded objects. For the latter operation especially, the melt needs to be fluid to fill the mold rapidly and completely at as low a temperature and pressure of processing as possible. Otherwise, molding will take longer or require more extreme conditions of temperature and pressure, which is both uneconomical and may lead to polymer degradation.

Several means exist for measuring the effect of the ionomeric additive on the flow behavior of the PVC compound. One is to compare the extent of mold fill in a long spiral mold under similar pressure/temperature conditions versus a PVC compound absent the acrylic ionomer, or against commercially purchased PVC injection molding blends. A second, less desirable, test is to measure pressure required to fill such a mold against such controls. A third is to measure a melt flow rate, extruding through a standardized orifice at standard conditions and measuring the amount of polymer extruded in 10 minutes versus such controls. A fourth is to compare viscosity values measured over a range of shear rates at a constant temperature in a commercial device for obtaining viscosity-shear rate response, such as a capillary rheometer. A fifth method is by comparing the value of equilibrium torque in a mixing device designed to measure torque at various temperatures of mixing as a value of time, such as a Haake or a Brabender rheometer.

Poly(vinyl chloride) containing the ionomeric additives of the present invention may be converted into many useful forms. Injection-molded PVC may be used to form many objects by direct injection molding, that is, molding into objects which require no further formation, such as stretching, blowing, etc., for consumer use. Such objects include toys, novelty items, automobile interior parts, such as trim knobs, door latches and lock handles, connectors, seat belt latch covers, ashtrays, fuse boxes, and the like, other automotive uses, such as bumpers, wheel wells, liners, parts for under-the-hood use, such as windshield washer and other aqueous fluid reservoirs, electrical connections, and the like, medical products, such as syringes and stoppers, appliance parts, such as lint filter housings for washing machines, spin tubs or agitators for washing machines, pump components, blower wheels, insulators, fan protective grills, switch housings, handles, and the like, household uses, such as bowls, cups, containers, covers for containers, such as coffee can lids, boxes for packaging of film, tape, disks, and the like, components of such recording devices, such as cassettes, film spindles, and the like, packaging uses, such as automotive dunnage, trays, and the like, tool handles, electrical plugs, pails, tubs, waste containers, laundry baskets, bottle base cups, paint cans, closures, such as for carbonated beverage containers, parts for appliances, such as refrigerator crispers, door liners, and the like, and many other similar forms.

Blow-molding may also be utilized to form useful objects by forming an extruded- or injection molded parison, then inflating and forming the parison in to the desired shape. Thus, bottles and other containers, and many other similar objects, may be prepared.

The PVC compound containing the ionomeric additive may also contain a chemical blowing agent, which will decompose at a higher temperature of processing to release a gas for causing the molten PVC to form foam, maintaining enough melt strength to retain the foamed shape on cooling. A gas may also be injected into the melt to form the foam. The PVC compound containing the ionomeric additive may be employed in the manufacture of many useful objects in profile form, such as clips, scrapers, luggage beads, garden edging, door stripping, gutters, downspouts, corrugated roofing, window and door casings, window tracks, siding, rub/-bruise strips, such as for cars and appliances, coated wire, picture framing, pipe for drain, waste, or vent use, electrical conduit, ducts, sheathings for wood, protective fascia, such as for automobiles, automotive liners, appliance components such as liners, hinges, edgings, trays, and the like, beam covers, straws for consuming drinks, troughs, corrugated tubing, support poles, such as for plants, ski poles, and the like.

The additive polymer will also be useful in processing blends of PVC with other polymers with which it is compatible, such as acrylonitrile-butadiene-styrene resins, and the like.

Without intending to be bound, the following examples are presented to illustrate a few embodiments of the invention.

Examples 1-4 describe syntheses of copolymers containing from essentially no acid (<0.1 parts per hundred) to about 10 parts per hundred (phr) carboxylic acid, based on 100 parts of (meth)acrylic ester and other vinyl monomers (e.g. styrene) in the (co)polymer. Molecular weight is controlled by the use of n-dodecyl mercaptan (n-DDM) chain transfer agent at 1.5 to 10 phr, based on 100 parts of the non-acid containing components of the polymer. All polymers are prepared by emulsion polymerization in a 3-liter, four neck, round bottom flask equipped with a mechanical stirrer, water cooled condenser, and thermometer, typically under a nitrogen gas blanket.

All polymers contain at least 30 weight % (meth)acrylate ester in their composition; the term "rich" indicates that at least 50 weight % of the monomer so designated is used in the polymer. The acid containing polymers of these examples are the precursor polymers to the acrylic ionomers which are formed by neutralization procedures described below.

EXAMPLE 1

Methyl Methacrylate Rich Polymers with Co-polymerized Carboxylic Acid

A. Methyl Methacrylate (MMA)/n-butyl Acrylate (BA)/Methacrylic Acid (MAA)//90/10/1.7 Weight Fractions To the apparatus described above are added, under nitrogen, 634 grams deionized water and 0.27 g of acetic acid. The stirred solution is heated to 80° C. During the heating of the above solution, a monomer emulsion mixture is prepared with the following ingredients: 400 g deionized water, 35.7 g sodium lauryl sulfate (28% aqueous solution), 1106 g MMA, 123 g BA, 21.5 g MAA and 31.2 g n-dodecyl mercaptan. The monomer mixture is emulsified with shaking. To the water and acetic acid solution in the flask, 80 g of the emulsified monomer mixture is added. Then a solution which contains 0.125 g sodium persulfate and 10 g deionized water is added to the flask. Within 10 minutes, an exotherm is observed and the peak temperature usually reaches 86° to 90° C. After the reaction is completed, the rest of the monomer emulsion mixture is added gradually over 3 hours. At the same time, a solution of 1.125 g sodium persulfate and 160 g deionized water is added separately to the reaction flask over three hours. During this addition period temperature is controlled at 80° to 83° C. After the gradual addition is complete, the reaction mixture is stirred at 80° C. for 30 minutes. At the end of 30 minutes, the product is cooled and filtered to remove any gels. The polymer is characterized by gel permeation chromatography, based on MMA polymer calibration, and analysis for Example 1.A yields weight average molecular weight (Mw) 27,600.

Examples 1.B through 1.J are prepared via the procedure described in Example 1.A except with the following monomer and n-DDM mixtures and yielding the following molecular weights:

| Exam-ple | Monomer Compositions | | | | |
|---|---|---|---|---|---|
| | MMA | BA | MAA | n-DDM | $M_w(10exp-3)$ |
| 1.B | 90 | 10 | 3.44 | 10 | 5.0 |
| 1.C | 90 | 10 | 3.44 | 5.0 | 11.5 |
| 1.D | 70 | 30 | 1.72 | 2.5 | 30 |
| 1.E | 90 | 10 | 1.72 | 5.0 | 12.6 |
| 1.F | 90 | 10 | 5.00 | 5.0 | 12.1 |
| 1.G | 90 | 10 | 0.86 | 1.5 | 45 |
| 1.H* | 50 | 0 | 1.72 | 2.0 | 52 |
| 1.I | 90 | 10 | 3.44 | 2.5 | 30 |
| 1.J | 90 | 10 | 6.88 | 2.5 | 30 |

*Note: Example 1.H contains 50 parts styrene.

EXAMPLE 2

Preparation of BA polymers containing <10 Weight % Methacrylic Acid (MAA)

A. A copolymer of BA/MAA//100/5.7 weight fraction

To the same apparatus described above, under nitrogen, are charged 453 g deionized water and 12 g acetic acid (as a 2 wt. % aqueous solution). With agitation, the mixture is heated to 55° C. During the heating of the above solution a monomer emulsion mixture is prepared with the following ingredients: 450 g deionized water, 23.26 g sodium lauryl sulfate (25.8% aqueous solution), 1135.7 g n-butyl acrylate, 64.32 g methacylic acid and 30 g n-dodecyl mercaptan. The monomer mixture is emulsified with shaking. To the water/acetic acid mixture in the flask, 102 g of the emulsified monomer mixture is added. Then the following solutions are added: 48 g of a 5% aqueous solution of sodium sulfoxylate formaldehyde and 14.4 g of a 5% aqueous solution of t-butyl hydroperoxide. Within 10 minutes, an exotherm is observed and the peak temperature typically reaches 65° to 68° C. After the reaction is completed, 5.25 g sodium sulfoxylate formaldehyde (as 5% aqueous solution) and 2.23 g t-butyl hydroperoxide (as 5% aqueous solution) are added. When no more exotherm is observed in 15 minutes, the mixture is cooled to 55° C. At 55° C., the rest of the monomer emulsion mixture and 13.95 g sodium lauryl sulfate (25.8% aqueous solution) are mixed well and the mixture is added to the reactor gradually over 3 hours. At the same time, 48 g sodium sulfoxylate formaldehyde (as a 5% aqueous solution) and 108 g t-butyl hydroperoxide (as a 5% solution) are added separately to the reaction flask over three hours. During this addition period, temperature of the mixture gradually reached 69° to 72° C. After the gradual addition complete, the reaction mixture is stirred at 65° C. for 15 minutes. At the end of the 15 minutes, the product is cooled and filtered to remove the gels. The polymer is characterized by gel permeation chromatography yielding weight average molecular weight of 29,000.

Example 2.B was prepared similarly, with the following monomer mixture: 100 BA/2.8 MAA weight fractions, with 2.5 phr n-DDM, yielding a co-polymer of Mw 28,000.

EXAMPLE 3

Preparation of Comparative Examples without Acid; MMA Rich with No MAA

A. MMA/BA//90/10% Weight Fraction

To the apparatus described above are charged 634 grams deionized water and 0.27 g. acetic acid, with agitation under the nitrogen blanket. The solution is heated to 80° C. While heating the above solution, a monomer emulsion mixture is prepared with the following ingredients: 400 grams deionized water, 35.7 g. sodium lauryl sulfate (28% aqueous solution), 1125 g. methyl methacrylate, 125 g. n-butyl acrylate and 62.5 g. n-dodecyl mercaptan. The monomer mixture is emulsified with shaking. To the water/acetic acid mixture in the flask, 80 g. of the emulsified monomer mixture is added. A solution which contains 0.125 g. sodium persulfate and 10 g. deionized water is then added to the flask. Within 10 minutes, an exotherm is observed and the peak temperature reaches 86° to 90° C. After the reaction is completed, the remainder of the monomer emulsion mixture is added gradually over 3 hours. Concurrently, a solution of 1.125 g. sodium persulfate and 160 g. deionized water is added separately to the reaction flask. During the 3-hour addition period, temperature is controlled at 80° C. 83° C. After the gradual addition is completed, the reaction mixture is stirred at 80° C. for 30 minutes. At the end of the 30 minute period, the product is cooled and filtered through cheesecloth to remove minor amounts of particulate matter, such as gels. The molecular weight of the polymer is characterized by gel permeation chromatography which shows a weight average molecular weight (Mw) of 11,000 and number average molecular weight (Mn) of 4,300. Comparative Example 3.B was prepared similarly, using the following monomer mixture: 70 MMA/30 BA, with 2.5 phr n-DDM, yielding a weight average molecular weight of 30,000.

EXAMPLE 4

Preparation of Comparative Examples without Acid; BA with No MAA

A. BA//100% weight fraction

To the same apparatus described and used in Example 1.A., under nitrogen, are added 453 grams deionized water and 12 g acetic acid (as a 2% aqueous solution). With stirring, the mixture is heated to 55° C. While heating, a monomer emulsion mixture is prepared containing the following ingredients: 448.2 g deionized water, 23.26 g sodium lauryl sulfate solution (26% aqueous solution), 1200 g butyl acrylate and 30 g n-dodecyl mercaptan. From this emulsion mixture, 102 g are charged to the reactor at 55° C. With stirring, 48 g 5% sodium sulfoxylate formaldehyde aqueous solution and 14.4 g 5% t-butyl hydroperoxide aqueous solution are added to the flask. Within 20 minutes, an exotherm to 69° C. is observed. After the exotherm, 5.25 g 5% sodium sulfoxylate formaldehyde aqueous solution and 2.23 g 5% t-butyl hydroperoxide aqueous solution are added. When no further exotherm is observed, the reaction mixture is cooled to 55° C. At 55° C., the remaining monomer mixture and 13.95 g sodium lauryl sulfate solution (26% aqueous solution) are mixed well and added to the reactor in three hours. At the same time, the following two solutions are also added to the flask over three hours: 48 g 5% sodium sulfoxylate formaldehyde aqueous solution and 108 g 5% t-butyl hydroperoxide aqueous solution. The temperature of the reaction mixture gradually increases to 67° to 74° C. At the end of the gradual addition, the mixture is stirred 15 minutes at 65° C. Then a chaser initiator combination of 9.6 g 5% sodium sulfoxylate formaldehyde aqueous solution and 4.8 g 5% t-butyl hydroperoxide aqueous solution are added. When no more exotherm is observed within 15 minutes, the mixture is cooled. The product is characterized by gel permeation chromatography, yielding Mw 43,000.

EXAMPLE 5

Neutralizing the Acid Containing Polymers

The acid-containing polymers of Examples 1 and 2 are partially or fully neutralized by the gradual addition of an appropriate base to the emulsion containing the acid polymers or to a solution of the previously isolated polymers. Isolation of the polymers from emulsions is by conventional freeze drying.

Thus, one example of neutralizing in emulsion of the acid-containing polymers to yield the sodium carboxylate is carried out with sodium hydroxide as a 5 wt % aqueous solution. The temperature at which the neutralization takes place varies according to the acid concentration in the polymer. When the acid concentration is under 2%, the neutralization is done at 80° C. and when the acid concentration is over 29% but under 4%, the neutralization is carried out at 55°-60° C. When the acid concentration is higher than about 4%, the neutralization is conducted advantageously in solution, as described below, using 2-butanone as solvent, a metal alkoxide neutralizing agent and hexane as precipitant.

The preparation of a 100% neutralized ionomer is exemplified by the procedure used with Example 1.A in forming the sodium carboxylate. Thus, to 596 parts of the emulsion containing polymer example 1.A are added 104 parts deionized water. The diluted emulsion is heated to 80° C. with stirring. Gradually, a solution containing 2.5 parts sodium hydroxide and 47.5 parts deionized water is mixed with the emulsion mixture and continuously stirred for 60 minutes when the pH of the mixture becomes stable at about 10.0 to 10.5 unit. The mixture is cooled and the polymer is isolated by conventional freeze drying procedures. The resulting powder is characterized by acid titration which reveals <0.1 weight % of unneutralized acid and shows the characteristic infrared absorption peak for carboxylate at 1585 cm−1.

The preparation in solution of partially or completely neutralized carboxylates in solution is exemplified by the procedure for forming the magnesium carboxylate of an MMA rich copolymer, Ex. 1.A. Thus, one hundred parts of the terpolymer methyl methacrylate/n-butyl acryate/methacrylic acid (90/10/1.72), Ex. 1.A, is dissolved in 150 parts 2-butanone. With stirring, a solution of 1.14 parts magnesium ethoxide and 9.5 parts methanol is slowly added to the butanone-terpolymer solution. When the reaction is complete, the solution viscosity is noticeably increased. The polymer is precipitated from the solution by adding 231 parts hexane. Then the solvent is decanted from the polymer semi-solid which is further washed with 132 parts hexane. The polymer is dried under vacuum at 50°–55° C. yielding a solid which is characterized by the infrared absorption peak for carboxylate at 1570 cm−1. Similar procedures are used for preparing alkaline and alkaline earth carboxylates in solution when acid contents of the polymer exceed about 4 phr.

EXAMPLE 6

Preparation of Poly(Vinyl Chloride) Compound Master Batches

Master batches of PVC compounds are prepared according to formulations A to D below, excluding the acrylic ionomers which were blended subsequently. The PVC formulations below are blended in a high intensity Welex blender with ca. 7 kg. capacity. The order of addition of the ingredients in the formulation and the corresponding temperature at which the addition was made are: PVC resin (room temperature), heat stabilizer (43°–49° C.), lubricants (55° C.), plasticizer (65° C.), impact modifier and processing aid (61° C.) and pigment (82° C.). The peak temperature of the blend is kept under 100° C. After all the ingredients are added and well mixed, the mixture is cooled to 55°–60° C. and discharged from the blender prior to subsequent use in formulating PVC/ionomer blends for testing and evaluation. PVC master batch formulations A to D are listed below.

| Formulation | Ingredients | Parts | Notes |
|---|---|---|---|
| A | PVC (K60) | 100 | Commercial PVC of K value 60; Geon 85 (BF Goodrich Co.) |
| | Heat Stabilizer | 2 | Mono/Dimethyltin bis(2-ethylhexylthio-glycolate); TM 181 (Morton Thiokol Co.) |
| | Lubricant | 2.7 | Glyceryl monostearate; Aldo MS (Lonza Co.) |
| | Lubricant | 0.3 | Polyethylene wax; AC 629A (Allied Chemical Co.) |
| | Acrylic Impact Modifier | 15 | Acrylic impact modifier with crosslinked low Tg core and grafted high Tg shell (KM355, Rohm and Haas Co.) |
| | Lubricating Processing Aid | 1.0 | K 175 (Rohm & Haas Co.) |
| | Titanium Dioxide | 1.5 | White pigment |
| B | Commercial PVC reinforced with 20% glass fiber | 100 | Geon 87803GR20 (BF Goodrich Co.) |
| C | PVC (K60) | 100 | Commercial PVC of K value 60; Geon 85 (BF Goodrich Co.) |
| | Heat Stabilizer | 2 | Mono/Dimethyltin bis(2-ethylhexyl thioglycolate); TM 181 (Morton Thiokol Co.) |
| | Lubricant | 1.0 | Glyceryl monostearate; Aldo MS (Lonza Co.) |
| | Lubricant | 0.3 | Polyethylene wax; AC 629A (Allied Chemical Co.) |
| | Acrylic Impact Modifier | 8.0 | Acrylic impact modifier with crosslinked low Tg core and grafted high Tg shell (KM355, Rohm and Haas Co.) |
| | Acrylic Processing Aid | 1.0 | K 120N (Rohm & Haas Co.) |
| | Titanium Dioxide | 1.5 | White pigment |

Formulation D, following, is used in dispersibility testing; its formulation is designed to exaggerate the appearance of undispersed gels in screening tests for that result.

| Formulation | Ingredients | Parts | Notes |
|---|---|---|---|
| D | PVC (K67) | 100 | Commercial PVC of K value 67; Geon 103 EPF 76 (BF Goodrich Co) |
| | Heat Stabilizer | 2.5 | Mono/Dimethyltin bis(2-ethylhexyl thioglycolate); TM181 (Morton Thiokol Co.) |
| | Plasticizer | 5.6 | Epoxidized soybean oil; Paraplex G-62 (C.P. Hall Co.) |
| | Plasticizer | 50 | Diisodecyl phthalate |

EXAMPLE 7

Blend Preparations of PVC with Acrylic Ionomer

Acrylic ionomer samples and related comparative control samples are normally dry mixed with the formulated PVC compound in a small Waring blender before processing. When the Tg of the ionomers is at or below room temperature, however, it is advantageous to carry out the direct addition of the emulsion containing the ionomer to the PVC compound without prior isolation of the ionomer. After mixing the ionomer emulsion and PVC compound in a Waring blender, the moist blend is then dried in a vacuum oven at 60° C. to remove residual moisture.

EXAMPLE 8

Testing of PVC Blends

This Example describes the various physical tests carried out on the ionomers and blends therof.

A. Testing Melt Viscosity by Equilibrium Torque

The dry blend of a given PVC formulation and a stated amount of acrylic ionomer, blended as described in Example 7, is tested using a 60 g sample in a Haake Torque Rheometer at 170°–180° C. and at a constant rotation rate of 50 rpm. The torque at equilibrium state, measured at 8–10 minutes of the testing time under this condition, is recorded.

B. Testing Heat Stability

The dry blend, as in Test A., is also tested in a Haake Torque Rheometer. The conditions for heat stability testing employ 195° C. and a constant roller speed of 40 rpm. As in Test A., the time to reach the torque maximum and the torque at equilibrium state, which is measured at 8–10 minutes of the testing time under this condition, are recorded. After the equilibrium state is reached, the material is subjected to further melt processing until the torque has increased 200 meter-gram above the equilibrium value. The time to this torque increase is recorded as the time to degradation.

C. Testing of Melt Viscosity by Capillary Viscometer

Pellets or granules are used in the capillary melt viscosity test. The pellets are formed by extrusion and pelletization; granules are obtained by milling and molding, followed by granualization. The blends being tested are usually given a 3-minute preheat before starting the measurement on a Goettfert Capillary Viscometer at 190°–200° C. The capillary has a length over diameter ratio of 30 to 1. The raw viscosity data are corrected by the Rabinowitsch correction equation.

D. Testing Ionomer Dispersibility in PVC

Comparisons of relative dispersibility of ionomer and comparative samples in PVC are carried out with 84.1 grams of PVC(Formulation D)/ionomer blends, prepared as described above, on a two-roll mill at 163° C. The speed of the rolls is 26 rpm for the front and 20 rpm for the rear roll. When the powder becomes a plasticized sheet, the material is cut and folded four times in total of 2 minutes. One strip of the sheet is then cut off and manually stretched from about 40 cm to approximately 80 cm. The amount of gel-like particles of undispersed processing aid is rated on a qualitative scale from 1 to 10, wherein 1 is excellent and 10 is poor.

E. Testing Physical Properties of PVC Blends with Ionomers

Blends of stated formulations and examples of ionomers and other comparative samples each are milled for 5 minutes at 176° C. on a two-roll mill and compression molded at 176° C. and 64,000 Kg pressure into 3 mm thick plaques. Physical properties are then tested in accordance with well defined test procedures, including notched or unnotched Izod impact strength (ASTM D256), heat distortion temperature (DTUFL; ASTM D648), tensile properties (ASTM D638), and flexural properties (ASTM D790).

EXAMPLE 9

Injection Molding

Blends are prepared with PVC of given master batch formulation and stated levels of acrylic ionomer or comparative controls. With Formulation C, the dry blends are extruded and pelletized in a twin screw extruder under the following conditions: barrel temperature of 150°, 160°, 165°, 165° and 170° C. and screw speed of 80 rpm. The dried pellets are then injection molded in an Arburg 270-90-350 injection molder with the following settings: 146°, 171°, 177° and 196° C. for the barrel temperatures, 400 rpm for the screw speed, and 32° C. for the mold temperature.

EXAMPLE 10

Comparative Viscosity-Reducing Effects of Ionomers in PVC

The data in Table 1 demonstrate the comparative melt-viscosity reducing effects of selected ionomers at 10 phr on PVC in blends based on Formulation A. Viscosity is substantially reduced by incorporation of the partially neutralized, sodium carboxylate ionomers.

TABLE 1

Effect of Acrylic Ionomers on the Melt Viscosity of PVC (Formulation A)

| Blend Example No. | 10A | 10B | 10C | 10D | 10E |
|---|---|---|---|---|---|
| Ionomer Example No. | — | 1B | 1C | 1A | 1D |
| Ionomer Composition: | | | | | |
| Methyl Methacrylate | — | 90 | 90 | 90 | 70 |
| Butyl Acrylate | — | 10 | 10 | 10 | 30 |
| Methacrylic Acid | — | 3.44 | 3.44 | 1.72 | 1.72 |
| Mw (10exp-3) | — | 5 | 11.5 | 28 | 30 |
| Neutralization % (Note 1) | — | 30 | 33 | 20 | 33 |
| Cation | — | Na+ | Na+ | Na+ | Na+ |
| PHR Ionomer on PVC in Formulation A. | 0 | 10 | 10 | 10 | 10 |
| Equilibrium Torque(N-M) (Note 2) | 15.1 | 13.5 | 13.7 | 14.5 | 13.2 |
| Capillary Viscosity at 200° C. (Pa-sec) at shear rate: | | | | | |
| 100 s-1 | 3006 | 2444 | — | 2596 | 2351 |
| 1000 s-1 | 506 | 433 | — | 462 | 426 |
| 10000 s-1 | 63 | 57 | — | 60 | 57 |

Note:
1. The carboxylic acid containing polymer of the synthesis example is neutralized to the degree indicated with aqueous sodium hydroxide by the neutralization methods described above.
2. Equilibrium torque is measured as described in Ex. 8. The mixing bowl is at 180° C., rotor speed at 50 rpm, and measurement of torque recorded at 8 minutes.

EXAMPLE 11

Physical Properties of Ionomer/PVC Blends

The data in Table 2 demonstrate that acrylic ionomers at high use levels, 14 phr on PVC in Formulation A, do not detract from the glass transition or heat distortion temperatures of PVC, while they increase tensile properties and only modestly reduce impact strength. Blend Examples 10A, 11E, and 11F provide useful comparisons containing non-ionomeric or no additives.

TABLE 2

Effect of Acrylic Ionomers on the Physical Properties of PVC (Formulation A)

| Blend Example No. | 10A | 11A | 11B | 11C | 11D | 11E | 11F |
|---|---|---|---|---|---|---|---|
| Ionomer Example No. | — | 1B | 1C | 1A | 1D | 3A | 3B |
| Ionomer Composition: | | | | | | | |
| Methyl methacrylate | — | 90 | 90 | 90 | 70 | 90 | 70 |
| Butyl acrylate | — | 10 | 10 | 10 | 30 | 10 | 30 |
| Methacrylic acid | — | 3.44 | 3.44 | 1.72 | 1.72 | 0 | 0 |
| Mw(10exp-3) | — | 5 | 11.5 | 28 | 30 | 11 | 30 |
| Neutralization, % | — | 100 | 100 | 100 | 100 | — | — |
| Cation | — | Na+ | Na+ | Na+ | Na+ | — | — |
| phr, on PVC | 0 | 14 | 14 | 14 | 14 | 14 | 14 |
| Glass transition Temperature, °C. | 78.1 | 76.6 | 78.5 | 79.2 | 77.6 | 75.3 | 77.2 |
| DTUFL, °C. | 58.6 | 60.0 | 62.6 | 62.3 | 57.3 | 60.4 | 58.8 |
| Tensile Yield Stress, MPa | 38.5 | 44.9 | 44.5 | 42.1 | 39.7 | 45.0 | 43.7 |

TABLE 2-continued

Effect of Acrylic Ionomers on the Physical Properties of PVC (Formulation A)

| Tensile Modulus GPa | 1.81 | 2.18 | 2.14 | 2.10 | 1.93 | 2.10 | 2.05 |
|---|---|---|---|---|---|---|---|
| 3.2 mm Notched Izod Impact at 23 C(J/M) | 1249 | 923 | 955 | 1142 | 998 | 811 | 1009 |

EXAMPLE 12

BA-Rich Ionomers in Formulation C

The data in Table 3 demonstrate the enhanced effects imparted by partially miscible, BA-rich ionomers on the viscosity reduction and impact properties of PVC in Formulation C. Comparative examples without ionomer in the PVC blend and with similar, but acid-free, partially miscible polymer in the blend are included. Samples are injected molded as described in Example 9.

TABLE 3

Effect of Acrylic Ionomers with Partial Miscibility on the Melt Viscosity and Physical Properties of PVC (Formulation C)

| Blend Example No. | 12A | 12B | 12C | 12D |
|---|---|---|---|---|
| Ionomer Example No. | — | 2B | 2A | 4A |
| Ionomer Composition: | | | | |
| Butyl acrylate | — | 100 | 100 | 100 |
| Methacrylic Acid | — | 2.8 | 5.7 | 0 |
| Mw (10exp-3) | — | 29 | 28 | 43 |
| Neutralization, % | — | 100 | 100 | — |
| Cation | — | Na+ | Na+ | — |
| phr | 0 | 5 | 5 | 5 |
| Capillary Viscosity at 200 °C. (Pa · sec) at shear rate: | | | | |
| 50 s-1 | 2999 | 1652 | 1968 | 1434 |
| 200 s-1 | 1358 | 931 | 997 | 754 |
| 1000 s-1 | 434 | 341 | 348 | 305 |
| DTUFL, °C. | | | | |
| Unannealed | 66.8 | 66.6 | 68.3 | 67.9 |
| Annealed at 80° C. | 70.9 | 71.5 | 71.9 | 70.5 |
| Tensile Yield Stress, MPa | 50.54 | 44.89 | 45.44 | 43.71 |
| Tensile Modulus GPa | 2.43 | 2.25 | 2.11 | 2.25 |
| Elongation at Break, % | 113 | 103 | 94 | 62 |
| Flexural modulus GPa | 2.76 | 2.48 | 2.50 | 2.48 |
| Izod Impact at 23° C. | | | | |
| Ductile Break, J/M | 1286 | 1089 | 1382 | 998 |
| Brittle Break, J/M | 187 | — | — | 356 |
| Ductile Break, % | 20 | 100 | 100 | 40 |
| Izod Impact at 10° C. | 66.2 | 153 | 138 | 155 |

EXAMPLE 13

Ionomer Effects in Glass Fiber Reinforced PVC

The data in Table 4 demonstrate the beneficial effects imparted by MMA-rich ionomers on the viscosity reducing, tensile, and impact properties of glass fiber reinforced PVC (Formulation B). Impact properties in the transverse direction are especially pronounced. Comparative examples (Blend Examples 13A, D, and E) are included.

TABLE 4

Effect of Acrylic Ionomers on the Melt Viscosity and Physical Properties of Glass Fiber Reinforced PVC (Formulation B)

| Blend Example No. | 13A | 13B | 13C | 13D | 13E |
|---|---|---|---|---|---|
| Ionomer Example No. | — | 1C | 1C | 3A | 3A |
| Ionomer Composition: | | | | | |
| Methyl methacrylate | — | 90 | 90 | 90 | 90 |
| Butyl acrylate | — | 10 | 10 | 10 | 10 |
| Methacrylic acid | — | 3.44 | 3.44 | 0 | 0 |
| Mw (10exp-3) | — | 11.5 | 11.5 | 10.8 | 10.8 |
| Neutralization, % | — | 100 | 100 | — | — |
| Cation | — | Na+ | Na+ | — | — |
| phr | 0 | 5 | 10 | 5 | 10 |
| Equilibrium torque at 190° C. (N-M) | 8.72 | 7.84 | 9.02 | 6.86 | 7.64 |
| Capillary Viscosity at 190° C. (Pa · sec) at shear rate: | | | | | |
| 25 s-1 | 3985 | 3190 | 2759 | 3045 | 2647 |
| 128 s-1 | 1763 | 1525 | 1392 | 1437 | 1270 |
| 1760 s-1 | 293 | 270 | 260 | 264 | 249 |
| Mechanical Properties: In Machining Direction | | | | | |
| DTUFL, °C. | 73.6 | 72.7 | 72.3 | 71.6 | 71.7 |
| Tensile stress at Break (MPa) | 69.16 | 67.98 | 68.67 | 64.61 | 54.53 |
| Tensile Modulus (GPa) | 4.84 | 4.44 | 4.19 | 4.08 | 3.57 |
| Izod Impact (J/M) | | | | | |
| Notched | 67.8 | 71.0 | 60.3 | 56.6 | 47.0 |
| Unnotched | 427 | 432 | 416 | 299 | 342 |
| In Transverse Direction: | | | | | |
| Izod Impact, J/M | | | | | |
| Notched | 32.0 | 41.1 | 36.8 | 37.9 | 28.8 |
| Unnotched | 267 | 336 | 315 | 267 | 213 |

The data in Table 5 demonstrate the improvements to mechanical properties imparted by other examples of MMA-rich ionomers at 5 phr, on fiber glass reinforced PVC, in Formulation B.

TABLE 5

Effect of Acrylic Ionomers on the Physical Properties of Fiber Glass Reinforced PVC (Formulation B)

| Blend Example No. | 13A | 13F | 13G | 13H | 13I | 13J | 13K |
|---|---|---|---|---|---|---|---|
| Ionomer Example No. | — | 1E | 1B | 1F | 1G | 1A | 1H |
| Ionomer Composition: | | | | | | | |
| Methyl methacrylate | — | 90 | 90 | 90 | 90 | 90 | 50 |
| Butyl acrylate | — | 10 | 10 | 10 | 10 | 10 | 0 |
| Styrene | — | 0 | 0 | 0 | 0 | 0 | 50 |
| Methacrylic acid | — | 1.72 | 3.44 | 5.00 | 0.86 | 1.72 | 1.72 |
| Mw (10exp-3) | — | 12.6 | 11.5 | 12.1 | 45 | 28 | 52 |
| Neutralization, % | — | 100 | 100 | 100 | 100 | 100 | 100 |
| Cation | — | Na+ | Na+ | Na+ | Na+ | Mg + 2 | Na+ |
| phr (on PVC) | 0 | 5 | 5 | 5 | 5 | 5 | 5 |
| Mechanical Properties:- In Machining Direction | | | | | | | |
| Tensile Stress at Break (MPa) | 68.3 | 69.5 | 68.0 | 69.2 | 71.0 | 74.7 | 70.7 |
| Tensile Mod. (GPa) | 4.79 | 4.84 | 4.79 | 5.16 | 4.14 | 4.47 | 4.47 |

TABLE 5-continued

Effect of Acrylic Ionomers on the Physical Properties of Fiber Glass Reinforced PVC (Formulation B)

| | | | | | | | |
|---|---|---|---|---|---|---|---|
| 3.2 mm notched Izod Impact (J/M) | 58.7 | — | 66.7 | — | 61.4 | 62.5 | 48.6 |
| 3.2 mm Unnotched Izod Impact (J/M) In Transverse Direction | 331 | 347 | 384 | 342 | 390 | 374 | 374 |
| Tensile Stress at Break (MPa) | 36.0 | 43.3 | 44.78 | 43.6 | — | — | — |
| Tensile Mod. (GPa) | 2.59 | 2.81 | 2.81 | 2.94 | — | — | — |
| 3.2 mm Unnotched Izod Impact (J/M) | 214 | 240 | 278 | 203 | 235 | 256 | 192 |

EXAMPLE 14

Effects of Ionomer Level Higher Than Useful

The data of Table 6 demonstrate the potentially detrimental effects on PVC blend properties if ionomer acid level is too high, in that the thermal stability of PVC is diminished and the dispersion of the ionomer is impeded.

TABLE 6

Effect of Acid Concentration on Processibility Using Formulations A and D

| Ionomer Example No. | — | 1A | 1I | 1J |
|---|---|---|---|---|
| Ionomer Composition: | | | | |
| Methyl methacrylate | — | 90 | 90 | 90 |
| Butyl acrylate | — | 0 | 10 | 10 |
| Methacrylic acid | — | 1.72 | 3.44 | 6.88 |
| Mw (10exp-3) | — | 28 | 30 | 30 |
| Neutralization, % | — | 100 | 100 | 100 |
| Cation | — | Na+ | Na+ | Na+ |
| In Formulation A at 195° C. | | | | |
| Blend Example No. | 10A | 14A | 14B | 14C |
| Phr of Ionomer, on PVC | 0 | 10 | 10 | 10 |
| Time to Fusion, sec | 24 | 14 | 16 | 24 |
| Equilibrium Torque(N-M) | 9.8 | 9.4 | 9.6 | 11.7 |
| Time to Degrade, min | 27 | 30 | 27 | 25 |
| In Formulation D | | | | |
| Blend Example No. | 14D | 14E | 14F | 14G |
| Phr of Ionomer, on PVC | 0 | 10 | 10 | 10 |
| Undispersed gels arbitrary rating (1 = least amount of gels) | 6 | 6 | 6.5 | >10 |

I claim:

1. A composition comprising:
   a. a polymer of vinyl chloride;
   b. an additive polymer containing at least 30 weight percent of units derived from at least one alkyl acrylate or alkyl methacrylate, wherein the alkyl group contains from 1 to 12 carbon atoms, from 0 to about 70 parts of units derived from at least one other vinyl or vinylidene monomer, and from about 0.5 to about 10 parts, per 100 parts of all other units of the additive polymer, of units derived from an alkali metal salt of an unsaturated acid, wherein the additive polymer is one non-grafted stage of a multi-stage polymer, the one non-grafted stage comprising at least about 50 weight percent of the multi-stage polymer.

2. The composition of claim 1, having a melt viscosity, as measured under injection molding conditions, equal to or less than the melt viscosity for the polymer of vinyl chloride absent the additive polymer, wherein the molecular weight of the non-grafted additive polymer stage is from about 5000 to about 400,000.

3. The composition of claim 2 having an immiscible or partially immiscible morphology at injection molding conditions.

4. The composition of claim 1, wherein one of the other vinyl or vinylidene monomers is an unsaturated acid, the unsaturated acid being from about 0.05 to about 9 parts per 100 parts of all other units of the additive polymer.

5. The composition of claim 1, 2, 3, or 4, wherein the weight-average molecular weight of any other stage of the multi-stage polymer is below about 100,000.

6. The composition of claims 1, 2, 3, or 4, wherein the additive polymer stage is at least 50% by weight of the multi-stage polymer.

7. The composition of claims 1, 2, 3, or 4, wherein another stage of the multi-stage polymer is a polymer having a glass temperature greater than about 60° C.

8. The composition of claim 7, wherein the another stage is a polymer formed predominantly of units derived from methyl methacrylate.

9. The composition of claim 1, wherein the composition further contains inorganic or organic filler or fiber.

10. The composition of claim 1, wherein the composition further contains one or more of impact modifier, lubricant, thermal stabilizer, plasticizer, surface-altering agent, organic pigment, heat-distortion improver additive, organic dye, or mold release agent.

11. The composition of claim 10, wherein the composition further contains inorganic or organic filler or fiber.

12. A film, sheet, extruded or molded object formed from the composition of claims 1, 9, 10 or 11.

13. The composition of claim 12, wherein the molded object is injection-molded.

* * * * *